US012583758B2

(12) United States Patent
Mays et al.

(10) Patent No.: US 12,583,758 B2
(45) Date of Patent: Mar. 24, 2026

(54) PROCESSES FOR DELITHIATING TRANSITION METAL OXIDES

(71) Applicant: BASF Corporation, Florham Park, NJ (US)

(72) Inventors: William C. Mays, Southfield, MI (US); Martin Lawrence Panchula, Beachwood, OH (US); Dieter G. Von Deak, Beachwood, OH (US); Benjamin Reichman, West Bloomfield, MI (US); Diana F. Wong, Sterling Heights, MI (US)

(73) Assignee: BASF CORPORATION, Florham Park, NJ (US)

( * ) Notice: Subject to any disclaimer, the term of this patent is extended or adjusted under 35 U.S.C. 154(b) by 810 days.

(21) Appl. No.: 17/905,674

(22) PCT Filed: Mar. 9, 2020

(86) PCT No.: PCT/US2020/021643
§ 371 (c)(1),
(2) Date: Sep. 6, 2022

(87) PCT Pub. No.: WO2021/183094
PCT Pub. Date: Sep. 16, 2021

(65) Prior Publication Data
US 2023/0114285 A1     Apr. 13, 2023

(51) Int. Cl.
*C01G 53/00* (2025.01)
*C01D 15/04* (2006.01)
*C01G 53/04* (2006.01)

(52) U.S. Cl.
CPC ............. *C01G 53/04* (2013.01); *C01D 15/04* (2013.01)

(58) Field of Classification Search
None
See application file for complete search history.

(56) References Cited

U.S. PATENT DOCUMENTS

| | | |
|---|---|---|
| 5,587,133 A | 12/1996 | Amatucci et al. |
| 2011/0254930 A1 | 10/2011 | Sugimoto |

(Continued)

FOREIGN PATENT DOCUMENTS

| | | |
|---|---|---|
| CN | 107069132 A | 8/2017 |
| CN | 107978814 A | 5/2018 |

(Continued)

OTHER PUBLICATIONS

Arai et al, characteristics of LixNiO2 obtained by chemical delithiation, Journal of Power Sources, pp. 81-82, 401-405 (Year: 1999).*

(Continued)

*Primary Examiner* — Stefanie J Cohen
(74) *Attorney, Agent, or Firm* — Peter DiMauro

(57) ABSTRACT

Provided are processes of removing lithium from an electrochemically active composition. The process of removing lithium from an electrochemically active composition may include providing an electrochemically active composition and combining the electrochemically active composition with a strong oxidizer optionally at a pH of 1.5 or greater for a lithium removal time. The electrochemically active composition may include Li, Ni, and O. The electrochemically active composition may optionally have an initial Li/M at % ratio of 0.8 to 1.3. According to some embodiments of the present disclosure, the lithium removal time may be such that a second Li/M at % ratio following the lithium removal time is 0.6 or less, thereby forming a delithiated electrochemically active composition.

25 Claims, 1 Drawing Sheet

(56) References Cited

U.S. PATENT DOCUMENTS

| | | |
|---|---|---|
| 2012/0136136 A1 | 5/2012 | Schougaard et al. |
| 2013/0247363 A1 | 9/2013 | Nelson et al. |
| 2018/0331361 A1 | 11/2018 | Nelson et al. |
| 2019/0207275 A1 | 7/2019 | Amouzegar et al. |

FOREIGN PATENT DOCUMENTS

| | | |
|---|---|---|
| CN | 110582467 A | 12/2019 |
| EP | 2296211 A1 | 3/2011 |
| EP | 2828202 B1 | 8/2018 |
| EP | 2828911 B1 | 1/2019 |
| EP | 3605665 A1 | 2/2020 |
| JP | 2011-223493 A | 11/2011 |
| JP | 2015-516649 A | 6/2015 |
| KR | 10-2019-0038326 A | 4/2019 |
| KR | 10-2019-0097161 A | 8/2019 |
| WO | 2018/208860 A1 | 11/2018 |

OTHER PUBLICATIONS

Mukai et al, Structural and Magnetic Nature for Fully Delithiated LixNiO2: Comparative Study between Chemically and Electrochemically Prepared Samples, J. Phys. Chem C, 114, pp. 8626-8632 (Year: 2010).*

Arai, Hajime et al., "Characteristics of $Li_xNiO_2$ obtained by chemical delithiation", Journal of Power Sources, 81-82, 1999, pp. 401-405.

Arai, Hajime et al., "Synthesis and electrode performance of layered nickel dioxide containing alkaline ions", *Electrochimica Acta 50*, (2005), pp. 1821-1828.

First Office Action dated Nov. 14, 2023, of counterpart Chinese Patent Application No. 202080098029.1, along with an English translation.

Yasushi Idemoto, et al., : "Lithium composition dependence of crystal and electronic structure of chemically delithiated Li1.2-x(Mn, Ni, Co)0.802," : SPring-8 Industry New Field Support Proposals, General Proposals, FY 2007 (Industrial Field) Implementation Report (2015), 2016, 2015B1582, Year 2015, month unknown, single document in both Japanese and translated into English.

Naoya Ishida, et al., "Crystal structure and cathode properties of delithiated Li1-xMn1/3Ni1/3Co1/3O2 for Mg rechargeable batteries", Solid State Ionics, vol. 343, Dec. 15, 2019, 115080.

Third-party submission presented to Japan Patent Office (JPO) in the matter of JP Patent Application 2022-550772, dispatched by JPO Feb. 12, 2025, single document in both Japanese and translated into English.

International Search Report dated Dec. 7, 2020, PCT/US2020/021643.

* cited by examiner

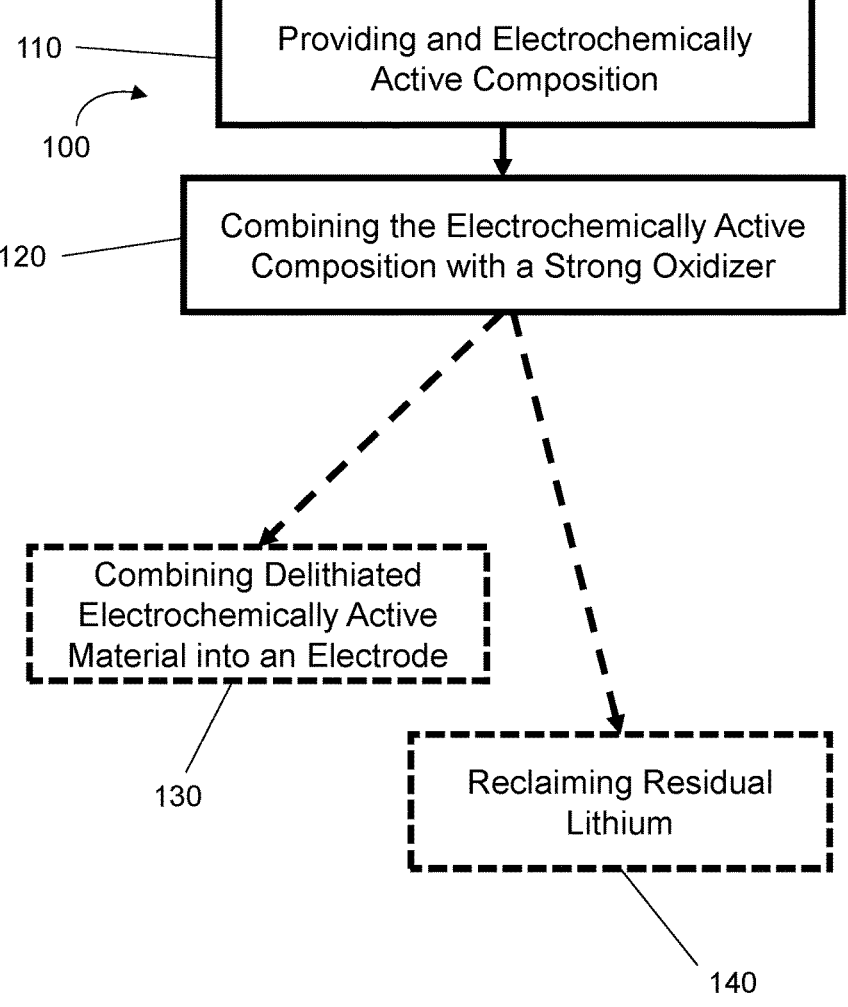

PROCESSES FOR DELITHIATING TRANSITION METAL OXIDES

This application is a national stage filing under 35 U.S.C. § 371 of International Application No. PCT/US2020/021643, filed on Mar. 9, 2020; the disclosure of this application is incorporated herein by reference in its entirety.

FIELD

This disclosure relates to the formation of electrochemically active compositions suitable for use in primary or secondary, and more particularly to the initial removal of lithium from as-synthesized or previously processed lithiated transition metal oxides.

BACKGROUND

The formation of electrochemically active compositions for use in batteries typically involves two primary steps. First, a precursor is formed by such as by co-precipitation reactions whereby transition metals are intermixed in the form of hydroxides or carbonates to form a precursor powder. This precursor is then mixed with a lithium compound and calcined under high temperature to form an electrochemically active composition.

At times it is beneficial to pre-charge the cathode material before utilizing it in a battery. During formation of a charged state of the cathode material according to traditional processes, the material is subjected to an acid wash to thereby remove the lithium yet maintaining the crystal arrangement of the other elements in the material. This allows the resulting delithiated material to be incorporated into "charged" electrochemical cells as the cathode electrochemically active composition.

Prior methods of achieving this dilithiation of the electrochemically active compositions suffered several drawbacks such as relatively high cost and low yields of the material (~50% yields). As such, improved processes are needed for the oxidation of lithiated electrochemically active compositions for their use in electrochemical cells.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

According to some embodiments of the present disclosure, a process of removing lithium from an electrochemically active composition may include providing an electrochemically active composition and combining the electrochemically active composition with a strong oxidizer for a lithium removal time. The electrochemically active composition may include Li, Ni, and O. The electrochemically active composition may optionally have an initial Li/Ni at % ratio of 0.9 to 1.15.

According to some embodiments of the present disclosure, the lithium removal time may be such that a second Li/Ni at % ratio following the lithium removal time is 0.6 or less, thereby forming a delithiated electrochemically active composition.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings and in which:

FIG. 1 illustrates a schematic of a process of forming a delithiated electrochemically active composition as provided herein according to some aspects;

It should be understood that as used in the appended drawings, dashed lines indicate optional components or process steps, while solid lines may indicate required components or process steps according to some embodiments of a process as described herein and presented for exemplary purposes alone.

DETAILED DESCRIPTION

The present disclosure is directed to new processes of forming delithiated electrochemically active compositions. Optionally these delithiated electrochemically active compositions may be suitable for use in an electrochemical cell, such as a primary or secondary battery. Provided are cost effective methods of forming delithiated metal oxides, illustratively delithiated nickel oxides. The processes as provided herein both use low cost reactants as well as produce greater yields of formed material than prior methods.

As used herein, the term "transition metal precursor" refers to a transition metal in the form of a hydroxide, oxide, oxyhydroxide, carbonate, or nitrate.

As used herein, the term "lithium compound" refers to a lithium containing composition in the form of a lithium hydroxide, lithium oxide, lithium carbonate, lithium nitrate, lithium sulfate, lithium acetate, lithium peroxide, lithium hydrogen carbonate, or a lithium halide.

As used herein, the term "active material precursor" refers to a product of an intermixing between a lithium compound, a transition metal precursor, and in some aspects a processing additive.

As used herein, the term "calcination" is understood as a thermal treatment in the presence of an oxidizing atmosphere so as to cause a chemical transformation of the material.

As used herein, the term "electrochemically active composition" refers to active material precursors that have been subjected to calcination.

As used herein, the term "delithiated electrochemically active composition" refers to electrochemically active compositions that have been subjected to a dilithiation process. A "dilithiation process" is a process which decreases the lithium atomic percent (at %) on a metals basis. Generally, a dilithiation process operates by oxidation of the cathode material.

A temperature as provided herein is optionally absolute as described or about the temperature defined as ±10° C. from the absolute number as described.

Processes are provided of forming an electrochemically active composition suitable for intercalating Li. Illustrative examples of transition metal oxide electrochemically active compositions include, but are not limited to chemistries based on LiNiMO where M is optional in the material and may be any transition metal, rare earth element, or combinations thereof. While much of the present disclosure is directed to delithiated electrochemically active compositions such as those that are predominantly Ni on an atomic basis, it is appreciated that the processes of forming of these materials in a charged state are equally attributable to other electrochemically active compositions as well.

With reference now to FIG. 1, a process 100 of removing lithium from an electrochemically active composition may include providing 110 an electrochemically active composition, combining 120 the electrochemically active composition with a strong oxidizer for a lithium removal time, and thereby forming a delithiated electrochemically active composition. Optionally, the process may include forming 130 the delithiated electrochemically active composition into a lithium ion battery cathode. Optionally, the process may include recycling 140 the lithium that was removed from the delithiated electrochemically active composition.

The electrochemically active composition prior to being subjected to the processes as described herein may include those falling under the formula $Li_xMO_2$ where x is the atomic ratio of Li to M and is typically from 0.8 to 1.3, and M is one or more of Co, Ni, Mn, Al, Mg, Ti, Zr, Nb, Hf, V, Cr, Sn, Cu, Mo, W, Fe, Si, Zn, B, other transition metals, a rare earth element, or combinations thereof. In some aspects, M is 1, 2, 3, 4, 5 or more of the foregoing list. Optionally, a composition includes Li, Ni, and O, alone or further optionally with one or more additional elements. Optionally a composition includes Li, Ni, Co and O alone or in combination with one or more elements. In some aspects, a composition includes Li, Ni, Co, Mg or Mn, and O alone or in combination with one or more other elements. Optionally, a composition includes Li, Ti and O alone or in combination with one or more other elements. It is envisioned that any electrochemically active composition suitable for use as a cathode active material in a primary or secondary electrochemical cell may be used in the process of delithiating as per this disclosure.

The electrochemically active composition, with or without other elements, may have an initial stoichiometric Li/M atomic percent (at %) ratio of 0.8 to 1.3, optionally 0.9 to 1.15, or any value or range therebetween. For example, the initial at % ratio of Li to nickel may be 0.9 to 1.1, or 0.95 to 1.15, or 0.95 to 1.05. The stoichiometric ratio of Li to M may be measured by any method known in the art. Illustratively, inductively coupled plasma atomic emission spectroscopy (ICP) or atomic absorption spectroscopy using standard methods optionally as described by J. R. Dean (*Practical Inductively Coupled Plasma Spectroscopy*, Chichester, England: Wiley, 2005, 65-87) and Welz and Sperling (Atomic Absorption Spectrometry, 3rd ed., Weinheim, Germany: Wiley VCH, 1999, 221-294). Illustratively, the chemical composition of each sample may be examined by a Varian Liberty 100 inductively-coupled plasma (ICP) system.

The electrochemically active composition may further include Li, Ni, O, and one or more additives. Optionally, the electrochemically active composition includes 1, 2, 3, 4, 5, 6, or more additives. The one or more additives are optionally Co, Mn, Al, Mg, Ti, Zr, Nb, Hf, V, Cr, Sn, Cu, Mo, W, Fe, Si, Zn, B, other transition metals, a rare earth element, or combinations thereof. A rare earth element may be one or more of La, Nd, Y, or any other element traditionally defined as a rare earth element. The one or more additives may comprise elements other than transition metals, such as processing aids, such as potassium. In some aspects, an electrochemically active composition includes Li, Ni, and Mg. In other aspects, an electrochemically active composition includes Li, Ni, and Mn.

In some aspects, an electrochemically active composition includes Ni and optionally one or more additives. In such aspects, the delithiated electrochemically active composition may include Ni at an atomic percentage (at %) relative to the total metals in the electrochemically active composition of 10 at % or greater, optionally 20 at % or greater, optionally 30 at % or greater, optionally 40 at % or greater, optionally 50 at % or greater, optionally 60 at % or greater, optionally 70 at % or greater, optionally 80 at % or greater, optionally 90 at % or greater, optionally 95 at % or greater, optionally 96 at % or greater, optionally 97 at % or greater, optionally 98 at % or greater, optionally 99 at % or greater, optionally 100 at %. Optionally, the atomic percentage of Ni is from 70 at % to 99 at % or greater. Optionally, the atomic percentage of Ni is from 80 at % to 99 at % or greater. Optionally, the atomic percentage of Ni is from 90 at % to 99 at % or greater. Optionally, Ni is the only transition metal designed in or present in the material such that Ni is present at substantially 100 at %.

Optionally, an electrochemically active composition includes Ni and one or more other transition metals. One or more other transition metals (other than Ni) are optionally each individually present at 0 at % to 90 at %, optionally 1 at % to 90 at %. Optionally, one or more other transition metals are each individually present at 0 at % to 50 at %, optionally 1 at % to 50 at %. Optionally, one or more other transition metals are each individually present at 1 at % to 30 at %, optionally 1 at % to 20 at %, optionally 1 at % to 10 at %, 1 at % to 7 at %, 1 at % to 5 at %, 2 at % to 20 at %, 5 at % to 20 at %, 10 at % to 20 at %. Optionally, 1, 2, 3, or more other transition metals other than Ni are present in an electrochemically active composition.

An electrochemically active composition has a particle size. Particle size is defined as D50, which is the diameter of the particle such that 50% of a sample's mass is smaller than and 50% of a sample's mass is larger than the D50. Optionally, a particle size is 1-20 μm or any value or range therebetween. Optionally, a particle size is 1-15 μm, optionally 1-10 μm, optionally 1-7 μm, optionally 4-7 μm, optionally 4-6 μm. Particle size may be measured by techniques known in the art, optionally laser diffraction.

A process as provided herein includes combining 120 the electrochemically active composition with a strong oxidizer. The combining step may occur at a pH of 1.0 or greater, optionally at a pH of 3.0 or greater. The strong oxidizer and electrochemically active composition are combined for a lithium removal time. Optionally the electrochemically active composition and strong oxidizer are combined at an elevated pH because some transition metals, such as $Ni^{2+}$, have increased solubility in acidic solutions. For example, the pH may be greater than 3.0, or greater than 4.0, or greater than 5.0, or greater than 6.0, or greater than 7.0, or greater than 8.0, or greater than 9.0, or greater than 10.0, or greater than 11.0, or greater than 12.0, or even greater than 13.0, or any combination thereof.

It should be understood that the step of combining 120 the electrochemically active composition with a strong oxidizer is a chemical oxidation process rather than electrochemical oxidation process. As such, according to some embodiments of the present disclosure, the combining 120 step may take place in a chemical rather than electrochemical reactor, such as a beaker, flask, fluidized bed reactor, CSTR, batch reactor, or any other suitable chemical reactor.

The strong oxidizer may be any oxidizing agent capable of promoting dilithiation of a $LiNiO_2$ material. For example, the strong oxidizer may be one or more of a hypochlorite salt, chlorite salt, chlorate salt, perchlorate salt, hydrogen peroxide, chlorine, molecular oxygen, or ozone. In embodiments where the strong oxidizer is ozone, the ozone may be bubbled through a solution that includes the electrochemically active material. According to some exemplary embodiments, the strong oxidizer may be or include a hypochlorite (ClO$^-$) salt. Optionally, the oxidation agent may include or be other oxidizing intermediates such at HOCl, OCl, or other species.

The strong oxidizer may be any oxidizing agent with a standard potential greater than 0.7 volts versus a standard hydrogen electrode (V vs SHE), optionally 1 (V vs SHE). Table 1 below gives several useful oxidizing agents and their standard potentials. For example, the strong oxidizer may be an oxidizing agent with a standard potential greater than optionally 0.7 (V vs SHE), or optionally 0.8 (V vs SHE), or optionally 0.9 (V vs SHE), or optionally 1.0 (V vs SHE), or optionally 1.1 (V vs SHE), or optionally 1.2 (V vs SHE), or optionally 1.3 (V vs SHE), or optionally 1.4 (V vs SHE), or optionally 1.5 (V vs SHE), or optionally 1.6 (V vs SHE), or optionally 1.7 (V vs SHE), or optionally 1.8 (V vs SHE), or optionally 1.9 (V vs SHE), or optionally 2.0 (V vs SHE), or optionally 2.1 (V vs SHE), or optionally 2.2 (V vs SHE), or optionally 2.3 (V vs SHE), or even greater than 2.3, or any combination thereof.

TABLE 1

| Oxidant | Standard potentials at 25° C. (V vs SHE). |
|---|---|
| Sodium Hypochlorite (NaOCl) | 0.94 |
| Bromine (Br$_2$) | 1.087 |
| Oxygen (O$_2$) | 1.229 |
| Chlorine (Cl$_2$) | 1.36 |
| Hydrogen Peroxide (H$_2$O$_2$) | 1.776 |
| Ozone (O$_3$) | 2.076 |
| Molecular Oxygen (O$^-$) | 2.42 |

The cation of the salt (e.g. hypochlorite salt, chlorite salt, chlorate salt, perchlorate salt) may be NH$_4$, Na, Ca, K, or combinations thereof. The salt refers to a cation with a hypochlorite (ClO$^-$), chlorite, chlorate, or perchlorate anion. For example, the hypochlorite salt may be NaClO, Ca(ClO)$_2$, KClO, or combinations thereof.

Optionally, a strong oxidizer includes chlorine. As an example, sodium hypochlorite includes chlorine. When a strong oxidizer such as a hypochlorite salt is used the pH is optionally below 9.0 and above 1.5, optionally below 9.0 and above 4.0, optionally below 9.0 and above 4.5.

When a strong oxidizer does not include a hypochlorite salt, the pH may be anywhere from 1.0 to 9.0, optionally from 2.0 to 9.0, optionally from 3.0 to 9.0, optionally from 4.0 to 9.0, optionally from 5.0 to 9.0.

According to some embodiments of the present disclosure, the strong oxidizer is not a persulfate, such as sodium persulfate. Avoiding the use of persulfates may be preferable for both economic and technical reasons. Persulfate based strong oxidizers may form acids and consequently decrease yield of the delithiated electrochemically active material by solubilizing nickel.

Optionally, the process may include recycling or reclaiming the lithium that was removed from the electrochemically active compositions. Recycling lithium poses a separations challenge of removing the lithium from the strong oxidizer and optionally, the salt of the strong oxidizer. Without being limited by theory, it is believed that separation of lithium from calcium may be easier than separation of lithium from sodium. Further, the 1:2 Ca:ClO$^-$ ratio reduces the quantity and concentration of calcium that may need to be removed. Thus, in some embodiments where recycling of lithium is used, it may be preferable to use calcium hypochlorite versus sodium hypochlorite. In some aspects, the Li may be reclaimed by a process substantially as described in U.S. Patent Application No. 62/754,739.

The molar ratio of strong oxidizer to electrochemically active composition during the dilithiation time may be equal to or greater than 0.1. Optionally, the molar ratio of strong oxidizer to electrochemically active composition during the dilithiation process may be equal to or less than 10. For example, the molar ratio may be equal to or greater than 0.1, equal to or greater than 0.2, equal to or greater than 0.3, equal to or greater than 0.4, equal to or greater than 0.5, equal to or greater than 1, equal to or greater than 2, equal to or greater than 3, equal to or greater than 4, equal to or greater than 5, equal to or greater than 6, equal to or greater than 7, equal to or greater than 8, equal to or greater than 9, equal to or greater than 10, or any combination of these. Optionally, the molar ratio of the molar ratio of strong oxidizer to electrochemically active composition may be equal to or less than 9, optionally equal to or less than 8, equal to or less than 7, equal to or less than 6, equal to or less than 5, equal to or less than 4, equal to or less than 3, equal to or less than 2. Optionally, the molar ratio of strong oxidizer to electrochemically active composition may be 1 to 10 or any value or range therebetween, optionally 1 to 8, optionally 2-8, optionally 1-5, optionally 2-5, optionally 1-4, optionally 2-4, optionally 2-3.

The lithium removal time may be such that a second Li/Ni at % ratio following the lithium removal time is 0.6 or less, thereby forming a delithiated electrochemically active composition. The second Li/Ni at % ratio may be taken after the lithium removal time but before installation in an electrochemical cell. According to some embodiments of the present disclosure, the second Li/Ni at % ratio following the lithium removal time may be less than 0.6, less than 0.5, less than 0.35, less than 0.3, less than 0.2, less than 0.1, less than 0.05, less than 0.03, or any combination thereof.

The lithium removal time may be 0.5 hours or greater. It should be understood that the lithium removal time is the amount of time for which the electrochemically active composition is in contact with the strong oxidizer. For example, the lithium removal time may be 0.5 hours or greater, 1 hour or greater, 1.5 hours or greater, 2 hours or greater, 3 hours or greater, 4 hours or greater, 5 hours or greater, 6 hours or greater, 7 hours or greater, 8 hours or greater, 9 hours or greater, or even greater than 10 hours, or any combination thereof.

According to some embodiments of the present disclosure, the process may be performed in the absence of a strong acid. A strong acid refers to an acid that ionizes completely in solution, such as those acids with a pKa less than about −1. The absence of a strong acid may be beneficial as Ni$^{2+}$ may be soluble in an acidic environment. This solubility results in a loss of up to 50% of the nickel in the electrochemically active material during dilithiation. For example, the process may be performed in the absence of sulfuric acid.

Optionally, the process may be performed in the presence of a strong acid, illustratively but not limited to HCl. Without being limited by theory, it is believed that while the presence of a strong acid may act to decrease the nickel yield, the oxidizing effect of the strong oxidizer may counteract the decreased yield. Ni$^{2+}$ may be soluble in acid but Ni$^{4+}$ is believed to be insoluble, even in acid. By oxidizing the nickel from the 2+ oxidation state to the 4+ oxidation state, more of the solid nickel containing material can be preserved.

The nickel yield may be greater than 5%. As used herein, the nickel yield refers to the ratio of the total weight of nickel initially in the electrochemically active material (at the time of the initial Li/Ni at % ratio) vs the total weight of nickel which is in the delithiated electrochemically active material following the lithium removal time (at the time of the second Li/Ni at % ratio). Optionally, the nickel yield may be equal to or greater than 5%, optionally equal to or greater than 10%, optionally equal to or greater than 15%, optionally equal to or greater than 20%, optionally equal to or greater than 25%, optionally equal to or greater than 30%, optionally equal to or greater than 35%, optionally equal to or greater than 40%, optionally equal to or greater than 45%, optionally equal to or greater than 50%, optionally equal to or greater than 60%, optionally equal to or greater than 70%, optionally equal to or greater than 80%, optionally equal to or greater than 90%, optionally equal to or greater than 95%, optionally equal to or greater than 98%, or even optionally equal to or greater than 99% of the weight of nickel initially in the electrochemically active material is in the delithiated electrochemically active material following the lithium removal time.

The initial capacity of the delithiated electrochemically active composition may be 250 mAh/g or greater. Initial capacity is optionally measured using a sintered counter electrode comprising predominantly Ni in an aqueous electrolyte. The initial capacity refers to the capacity of the delithiated electrochemically active composition during the first cycle of electrochemical discharge. For example, the initial capacity may be 250 mAh/g or greater, 300 mAh/g or greater, 400 mAh/g or greater, 500 mAh/g or greater, 600 mAh/g or greater, 700 mAh/g or greater, 800 mAh/g or greater, 900 mAh/g or greater, or even greater than 1000 mAh/g, or any combination thereof.

Various aspects of the present invention are illustrated by the following non-limiting examples. The examples are for illustrative purposes and are not a limitation on any practice of the present invention. It will be understood that variations and modifications can be made without departing from the spirit and scope of the invention.

EXAMPLES

In the following examples, except where otherwise indicated, 12.5 percent (%) by weight sodium hypochlorite aqueous solutions were combined with LiNiO, in varying volumes and at varying pH values. The reactants were combined in a reactor capable of stirring and temperature control. The reactor was mixed at sufficient speed to keep the LiNiO in suspension and was kept at 25° C.+/−2° C.

Example 1

In Example 1 the generalized example described above was performed at a pH of 13.2 and with a variety of volume (of 12.5% NaOCl)/weight LiNiO ratios. Table 2 below gives the dependence of average Ni oxidation state, final Li/Ni atomic ratios, and capacity based on V/weight or mol/mol at a pH of 13.2.

TABLE 2

| Volume (12.5% NaOCl)/ weight (LiNiO), v/w (ml/g) | NaOCl/ LiNiO (mol/mol) | Average Ni Oxidation state | Li/Ni Atomic Ratio | Av. Capacity (mAh/g) |
|---|---|---|---|---|
| 12.5 | 2.95 | 3.21 | 0.46 | 133 |
| 25 | 5.90 | 3.25 | 0.41 | 156 |
| 50 | 11.80 | 3.28 | 0.38 | 196 |
| 100 | 23.61 | 3.32 | 0.30 | 207 |

Example 2

In Example 2 the generalized example described above was performed at a pH of 7 and with a variety of volume (of 12.5% NaOCl)/weight LiNiO ratios. Table 3 below gives the dependence of average Ni oxidation state, and capacity on V/weight and mol/mol at a pH of 7.

TABLE 3

| Volume (12.5% NaOCl)/ weight (LiNiO), v/w (ml/g) | NaOCl/ LiNiO (mol/mol) | Average Ni Oxidation state | Av. Capacity (mAh/g) |
|---|---|---|---|
| 12.5 | 2.95 | 3.25 | 233 |
| 25 | 5.90 | 3.34 | 313 |
| 50 | 11.80 | 3.47 | 371 |
| 100 | 23.61 | 3.53 | 423 |

Example 3

In Example 3 the generalized example described above was performed at a range or pH values from 7 to 13.2. The dilithiation time was 6 hours and an average particle size of 4.73 microns was used. Table 4 below gives the dependence of average Ni oxidation state, Li/Ni atomic ratio, and capacity on pH.

TABLE 4

| pH | Average Ni Oxidation state | Li/Ni Atomic Ratio | Av. Capacity (mAh/g) |
|---|---|---|---|
| 13.2 | 3.32 | 0.31 | 230 |
| 9 | 3.45 | | 340 |
| 8 | 3.51 | | 362 |
| 7 | 3.51 | 0.11 | 378 |

Example 4

In Example 4 the generalized example described above was performed at a pH of 7, a NaOCl/LiNiO V/w of 25, NaOCl/LiNiO mol/mol of 5.90, and an oxidation time of 5 hours (hrs). Example 4 yielded an average capacity of 391 mAh/g and an average Ni oxidation state of 3.5.

Example 5

In Example 5 the generalized example described above was performed at a pH of 6, a NaOCl/LiNiO V/w of 25, NaOCl/LiNiO mol/mol of 5.90, and an oxidation time of 5 hours (hrs). Example 5 yielded an average capacity of 417 mAh/g and an average Ni oxidation state of 3.53.

Example 6

In Example 6 the generalized example described above was performed at a pH of 6, a NaOCl/LiNiO V/w of 25, NaOCl/LiNiO mol/mol of 5.90, and an oxidation time of 8 hours (hrs). Example 5 yielded an average capacity of 402 mAh/g and an average Ni oxidation state of 3.55.

Example 7

In Example 7 the generalized example described above was performed at a pH of 5, a NaOCl/LiNiO V/w of 25, NaOCl/LiNiO mol/mol of 5.90, and an oxidation time of 5 hours (hrs). Example 5 yielded an average capacity of 399 mAh/g and an average Ni oxidation state of 3.52.

Example 8

In Example 8 the generalized example described above was performed at a pH of 5, a NaOCl/LiNiO V/w of 16.7, NaOCl/LiNiO mol/mol of 3.93, and an oxidation time of 5 hours (hrs). Example 5 yielded an average capacity of 399 mAh/g and an average Ni oxidation state of 3.49.

Example 9

In Example 9 the generalized example described above was performed at a pH of 13.2, a temperature of 35° C., and a NaOCl/LiNiO V/w of 100, NaOCl/LiNiO mol/mol of 23.61. Table 5 below gives the dependence of average Ni oxidation state, Li/Ni atomic ratios, and average capacity at various delithiation times.

TABLE 5

| Delithiation Time (Hours) | Average Ni Oxidation state | Li/Ni Atomic Ratio | Av. Capacity (mAh/g) |
|---|---|---|---|
| 0 | 2.90 | 1.0 | 0 |
| 1 | 2.97 | 0.72 | 5 |
| 2 | 3.08 | 0.60 | 19 |
| 3 | 3.221 | 0.47 | 102 |
| 4 | 3.29 | 0.35 | 195 |
| 5 | 3.32 | 0.30 | 207 |
| 6 | 3.32 | 0.31 | 222 |
| 7 | 3.36 | 0.305 | 222 |
| 8 | 3.35 | 0.30 | 204 |

Example 10

In Example 10 the generalized example described above was performed at a pH of 13.2, and a V (NaOCl)/w (particles) of 100. Table 6 below gives the dependence of average Ni oxidation state, Li/Ni atomic ratios, and average capacity on both delithiation time and NaClO concentration.

TABLE 6

| NaOCl Concentration (wt %) | Delithiation Time (Hours) | Average Ni Oxidation state | Li/Ni Atomic Ratio | Av. Capacity (mAh/g) |
|---|---|---|---|---|
| 13 | 5 | 3.32 | 0.30 | 207 |
| 13 | 7 | 3.36 | | 222 |
| 6.5 | 5 | 3.21 | 0.43 | 147 |
| 6.5 | 7 | 3.27 | | 191 |
| 3.25 | 5 | 3.01 | 0.64 | 14 |
| 3.25 | 7 | 3.13 | | 49 |

Example 11

In Example 11 the generalized example described above was performed at a pH of 6 and 7, and a temperature of 25° C. and 35° C. Table 7 below gives the dependence of capacity on temperature and pH.

TABLE 7

| pH | Capacity (mAh/g) at 25° C. | Capacity (mAh/g) at 35° C. |
|---|---|---|
| 7 | 391 | 323 |
| 6 | 417 | 389 |

The forgoing description of particular aspect(s) is merely exemplary in nature and is in no way intended to limit the scope of the invention, its application, or uses, which may, of course, vary. The disclosure is provided with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Various modifications of the present invention, in addition to those shown and described herein, will be apparent to those skilled in the art of the above description. Such modifications are also intended to fall within the scope of the appended claims.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular aspects of the invention, but is not meant to be a limitation upon the practice thereof.

The invention claimed is:

1. A chemical process of removing lithium from an electrochemically active composition, wherein the process comprising:

providing an electrochemically active composition defined by a formula of $Li_xMO_2$ where M is optionally one or more metals, transition metals, rare earth metals or combinations thereof, and x is a first Li/M at % ratio of 0.8 to 1.3; and combining the electrochemically active composition with a strong oxidizer for a lithium removal time, wherein the strong oxidizer is one or more of a hypochlorite salt, chlorite salt, chlorate salt, perchlorate salt, hydrogen peroxide, chlorine, hypochlorous acid, or ozone, and wherein the lithium removal time is such that a second Li/M at % ratio following the lithium removal time is 0.6 or less, thereby forming a delithiated electrochemically active composition.

2. The process of claim 1, wherein the process is performed in the absence of a strong acid.

3. The process of claim 1, wherein the process is performed in the absence of sulfuric acid.

4. The process of claim 1, wherein the strong oxidizer is not a persulfate.

5. The process of claim 1, wherein the cation of the salt is $NH_4$, Na, Ca, K, or combinations thereof.

6. The process of claim 1, wherein the pH at the step of combining is equal to or greater than 3.0.

7. The process of claim 1, wherein the pH at the step of combining is equal to or greater than 4.0.

8. The process of claim 1, wherein the pH at the step of combining is equal to or greater than 5.0.

9. The process of claim 1, wherein the pH at the step of combining is equal to or greater than 7.0.

10. The process of claim 1, wherein the step of combining is in the presence of a strong acid.

11. The process of claim 10, wherein the strong acid is HCl.

12. The process of claim 1, wherein the lithium removal time is 0.5 hours or greater.

13. The process of claim 1, wherein the lithium removal time is 4 hours or greater.

14. The process of claim 1, wherein the lithium removal time is 5 hours or greater.

15. The process of claim 1, wherein the second Li/Ni at % ratio is less than 0.5.

16. The process of claim 15, wherein the second Li/Ni at % ratio is less than 0.35.

17. The process of claim 15, wherein the second Li/Ni at % ratio is less than 0.3.

18. The process of claim 1, wherein the molar ratio of strong oxidizer to electrochemically active composition is equal to or greater than 0.5.

19. The process of claim 18, wherein the molar ratio is equal to or greater than 1.

20. The process of claim 18, wherein the molar ratio is equal to or greater than 5.

21. The process of claim 1, wherein the initial capacity of the delithiated electrochemically active composition is 250 mAh/g or greater.

22. The process of claim 21, wherein the initial capacity is 400 mAh/g or greater.

23. A chemical process of removing lithium from an electrochemically active composition, wherein the process comprising:

providing an electrochemically active composition defined by a formula of $Li_xMO_2$ where M is optionally one or more metals, transition metals, rare earth metals or combinations thereof, and x is a first Li/M at % ratio of 0.8 to 1.3; and combining the electrochemically active composition with a strong oxidizer for a lithium removal time, wherein the lithium removal time is such that a second Li/M at % ratio following the lithium removal time is 0.6 or less, thereby forming a delithiated electrochemically active composition; and wherein the electrochemically active composition comprises Li, Ni, O, and one or more additives.

24. A chemical process of removing lithium from an electrochemically active composition, wherein the process comprising:

providing an electrochemically active composition defined by a formula of $Li_xMO_2$ where M is optionally one or more metals, transition metals, rare earth metals or combinations thereof, and x is a first Li/M at % ratio of 0.8 to 1.3; and combining the electrochemically active composition with a strong oxidizer for a lithium removal time, wherein the step of combining is in the presence of a strong acid, wherein the strong acid is HCl, wherein the lithium removal time is such that a second Li/M at % ratio following the lithium removal time is 0.6 or less, thereby forming a delithiated electrochemically active composition.

25. The process of claim 23, wherein the one or more additives is selected from the group consisting of Co, Mn, Al, Mg, Ti, Zr, Nb, Hf, V, Cr, Sn, Cu, Mo, W, Fe, Si, Zn, B, a rare earth element, or combinations thereof.

* * * * *